US007765369B1

(12) United States Patent
Prahlad et al.

(10) Patent No.: US 7,765,369 B1
(45) Date of Patent: Jul. 27, 2010

(54) METHOD AND SYSTEM FOR SELECTIVELY DELETING STORED DATA

(75) Inventors: Anand Prahlad, East Brunswick, NJ (US); Parag Gokhale, Ocean, NJ (US); David Alan Oshinsky, East Brunswick, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 1039 days.

(21) Appl. No.: 11/269,521

(22) Filed: Nov. 7, 2005

Related U.S. Application Data

(60) Provisional application No. 60/626,076, filed on Nov. 8, 2004, provisional application No. 60/625,746, filed on Nov. 5, 2004.

(51) Int. Cl.
*G06F 12/00* (2006.01)
*G06F 7/00* (2006.01)
(52) U.S. Cl. .................. 711/159; 711/162; 711/165; 707/692; 707/693; 707/796; 707/803
(58) Field of Classification Search .......... 711/118, 711/159, 162, 165; 707/100, 101, 206, E17.002, 707/E17.008, 692, 693, 796, 803
See application file for complete search history.

(56) References Cited

U.S. PATENT DOCUMENTS

| 4,686,620 | A |   | 8/1987  | Ng             |         |
|-----------|---|---|---------|----------------|---------|
| 4,995,035 | A |   | 2/1991  | Cole et al.    |         |
| 5,005,122 | A |   | 4/1991  | Griffin et al. |         |
| 5,093,912 | A |   | 3/1992  | Dong et al.    |         |
| 5,133,065 | A |   | 7/1992  | Cheffetz et al.|         |
| 5,193,154 | A |   | 3/1993  | Kitajima et al.|         |
| 5,212,772 | A |   | 5/1993  | Masters        |         |
| 5,226,157 | A |   | 7/1993  | Nakano et al.  |         |
| 5,239,647 | A |   | 8/1993  | Anglin et al.  |         |
| 5,241,668 | A |   | 8/1993  | Eastridge et al.|        |
| 5,241,670 | A |   | 8/1993  | Eastridge et al.|        |
| 5,265,159 | A | * | 11/1993 | Kung           | 713/193 |
| 5,276,860 | A |   | 1/1994  | Fortier et al. |         |
| 5,276,867 | A |   | 1/1994  | Kenley et al.  |         |

(Continued)

FOREIGN PATENT DOCUMENTS

EP     0259912     3/1988

(Continued)

OTHER PUBLICATIONS

Recycle Bin (Windows), Aug. 2007, Wikipedia, pp. 1-3.

(Continued)

*Primary Examiner*—Brian R Peugh
*Assistant Examiner*—Mehdi Namazi
(74) *Attorney, Agent, or Firm*—Perkins Coie LLP

(57) ABSTRACT

A method and system are provided for selectively deleting data stored to storage media, such as a tape, in a network storage system. An instruction to delete selected data is received and the location of the data selected for deletion is identified. The location of the data is obtained by consulting an index of storage data. The selected data is retrieved, together with any other data on the tape that precedes the selected data. The retrieved data, excluding the selected data, is copied to a tape. The index is updated to reflect the changes in the stored data on the tape.

28 Claims, 3 Drawing Sheets

U.S. PATENT DOCUMENTS

| | | |
|---|---|---|
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,455,926 A * | 10/1995 | Keele et al. .................... 711/4 |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,677,900 A * | 10/1997 | Nishida et al. ................ 360/13 |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton et al. |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,137,864 A | 10/2000 | Yaker |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 * | 3/2002 | Dunham .................... 711/162 |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,658,526 B2 | 12/2003 | Nguyen et al. |
| 6,789,161 B1 | 9/2004 | Blendermann et al. |
| 6,973,553 B1 | 12/2005 | Archibald, Jr. et al. |
| 7,035,880 B1 | 4/2006 | Crescenti et al. |
| 7,103,731 B2 | 9/2006 | Gibble et al. |
| 7,103,740 B1 | 9/2006 | Colgrove et al. |
| 7,107,395 B1 | 9/2006 | Ofek et al. |
| 7,155,465 B2 | 12/2006 | Lee et al. |
| 7,246,140 B2 | 7/2007 | Therrien et al. |
| 7,293,133 B1 | 11/2007 | Colgrove et al. |
| 7,467,167 B2 | 12/2008 | Patterson |
| 2002/0040376 A1 * | 4/2002 | Yamanaka et al. .......... 707/530 |
| 2002/0049778 A1 | 4/2002 | Bell et al. |
| 2002/0069324 A1 * | 6/2002 | Gerasimov et al. .......... 711/114 |
| 2002/0087822 A1 | 7/2002 | Butterworth |
| 2003/0196036 A1 | 10/2003 | Gibble et al. |
| 2003/0225800 A1 * | 12/2003 | Kavuri ....................... 707/204 |
| 2004/0107199 A1 | 6/2004 | Dalrymple et al. |
| 2004/0193953 A1 | 9/2004 | Callahan et al. |
| 2005/0033755 A1 | 2/2005 | Gokhale et al. |
| 2009/0313448 A1 | 12/2009 | Gokhale et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

U.S. Appl. No. 11/269,515, filed Nov. 7, 2005, Gokhale et al.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGNOPS*, vol. 25, No. 5, New York, US, pp. 1-15 (May 1991).

U.S. Appl. No. 12/276,868, filed Nov. 24, 2008, Gokhale et al.

Ashton et al., "Two Decades of policy-based storage management for the IBM mainframe computer", www.research.ibm.com, 19 pages, published Apr. 10, 2003, printed Jan. 3, 2009.

Final Office Action for U.S. Appl. No. 10/818,750, Mail Date Jan. 7, 2009, 9 pages.

Notice of Allowance for U.S. Appl. No. 10/818,750, Mail Date May 29, 2009, 5 pages.

\* cited by examiner

US 7,765,369 B1

METHOD AND SYSTEM FOR SELECTIVELY DELETING STORED DATA

PRIORITY CLAIM

This application claims the benefit of U.S. provisional application No. 60/626,076 titled SYSTEM AND METHOD FOR PERFORMING STORAGE OPERATIONS IN A COMPUTER NETWORK, filed Nov. 8, 2004, and U.S. provisional application No. 60/625,746 titled STORAGE MANAGEMENT SYSTEM filed Nov. 5, 2004, each of which is incorporated herein by reference in its entirety.

RELATED APPLICATIONS

This application is related to the following applications, each of which is hereby incorporated herein by reference in its entirety:

- application Ser. No. 09/354,058, titled Hierarchical Backup And Retrieval System, filed Jul. 15, 1999, now U.S. Pat. No. 7,395,282;
- U.S. Pat. No. 6,418,478, titled Pipelined High Speed Data Transfer Mechanism, filed Mar. 11, 1998;
- application Ser. No. 09/610,738, titled Modular Backup And Retrieval System Used In Conjunction With A Storage Area Network, filed Jul. 6, 2000, now U.S. Pat. No. 7,035,880;
- application Ser. No. 10/818,749, titled System And Method For Dynamically Performing Storage Operations In A Computer Network, filed Apr. 5, 2004, now U.S. Pat. No. 7,246,207;
- application Ser. No. 10/877,831, titled Hierarchical System And Method For Performing Storage Operations In A Computer Network, filed Jun. 25, 2004, now U.S. Pat. No. 7,454,569;
- Application Ser. No. 60/567,178, titled Hierarchical System And Method For Performing Storage Operations In A Computer Network, filed Apr. 30, 2004;
- application Ser. No. 11/269,520, titled System And Method For Performing Multistream Storage Operations, filed Nov. 7, 2005;
- application Ser. No. 11/269,512, titled System And Method To Support Single Instance Storage Operations, filed Nov. 7, 2005, now U.S. Patent Publication 2006-0224846;
- application Ser. No. 11/269,514, titled Method And System Of Pooling Storage Devices, filed Nov. 7, 2005;
- application Ser. No. 11/269,519, titled Method And System For Grouping Storage System Components, now U.S. Pat. No. 7,500,053, filed Nov. 7, 2005;
- application Ser. No. 11/269,515, titled Systems And Methods For Recovering Electronic Information From A Storage Medium, filed Nov. 7, 2005, now U.S. Pat. No. 7,472,238; and
- application Ser. No. 11/269,513, titled Method And System For Monitoring A Storage Network, filed Nov. 7, 2005;

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to data storage systems in computer networks and, more particularly, to improvements in administering data on storage media by providing the capability of selectively deleting stored data.

There are many different computing architectures for storing electronic data. Individual computers typically store electronic data in volatile storage devices such as Random Access Memory (RAM) and one or more nonvolatile storage devices such as hard drives, tape drives, or optical disks, that form a part of or are directly connectable to the individual computer. In a network of computers such as a Local Area Network (LAN) or a Wide Area Network (WAN), storage of electronic data is typically accomplished via servers or stand-alone storage devices accessible via the network. These individual network storage devices may be networkable tape drives, optical libraries, Redundant Arrays of Inexpensive Disks (RAID), CD-ROM jukeboxes, and other devices.

Storage media used for storing electronic data in such computing architectures include, for example, tapes, hard drives, disks, optical disks and other storage media. In some storage operations performed by a system, data is written to storage media, which is stored in a storage device in the system. Often, there is no logic associated with selecting a particular piece of media that is appropriate for the storage operation. In addition, there is no post storage operation check to determine remaining media capacity. Thus, there are storage systems which maintain storage devices containing media that is not entirely filled with data, which results in the system having to utilize more storage media than is necessary to accommodate its data storage requirements.

Another problem with existing storage systems, is that data stored to storage media may include more than one data file. Currently, to remove, or otherwise delete data files from storage media, all files stored to the storage media must be deleted. There is therefore a need to remove one or more selected stored files from the storage media, while retaining some of the non-selected stored files, without removing all of the data stored on the storage media. This results in storage systems maintaining data files on storage media that are no longer needed, and precludes the ability to delete certain files, for example, when a certain data type is no longer needed to be stored.

BRIEF SUMMARY OF THE INVENTION

The present invention includes a method and system for allocating storage space in a storage network, more particularly, to providing deletion of selected stored data.

According to one embodiment of the invention, a method is provided for selectively deleting data stored on storage media. A first data file is identified, according to selection criteria. The first data file is selected to be deleted in accordance with selection criteria, which can be, for example a manual input from a user, or in accordance with a storage policy or template, such as a policy relating to file type, file storage duration, storage preferences, storage characteristics, aging criteria, or other criteria. The first data file and its file location are identified by consulting index data, such as index data in a media management index or storage manager index. The first data file is generally located on an item of storage media which contains one or more other data files. The first data file is retrieved from the storage media together with one or more other data files that precede the first data file. The first data file and the one or more other data files that precede the first data file are retrieved to a media management component temporarily, such as in a buffer or cache. The one or more data files are copied from the media management component or other temporary storage to a storage media, such as the tape on which the files were originally stored, or other suitable media. The first data file is not copied to the storage media and is thus deleted. Data relating to the one or more other data files, e.g., location and other file information is stored to an index, such as to the media management or storage manager index. Data relating to the first data file, which has been selectively deleted from the storage media, is removed from the index, e.g. by deleting pointers to the data reference.

According to another embodiment of the invention, a method is provided for selectively deleting data stored on storage media, such as tape. The data selected for deletion is typically stored on storage media that contains more than one data file. Examples of storage media include, for example, a tape, or other storage media. The storage system receives an instruction to delete at least one selected data file. In other embodiments of the invention, a storage manager receives the deletion instruction, which is input by a client, user, or other system component. The deletion instruction can be input manually by the user, or automatically generated in accordance with storage policies, user preferences, or other storage logic.

According to another embodiment of the invention, a media management component or storage manager, as further described herein, identifies a location of the selected data file. The location of the selected data file is typically on a storage medium. In some embodiments of the invention, the storage manager consults its index to determine the location of the selected data file. In yet another embodiment of the invention, the storage manager consults its index to determine the media management component(s) that is associated with the selected data file and queries the associated media management component to identify the location of the selected data file. In this embodiment, the media management component consults its index of storage data to determine the location of the selected data file.

When the location of the selected data file is determined, the media management component retrieves the selected data file(s) and other data preceding the selected data file(s) from the storage media. In another embodiment, the media management component retrieves or copies the selected data file(s) and other data preceding the selected data file(s) to a cache, buffer or other temporary storage associated with the media management component. The retrieved data, except for the selected data file, is copied back to storage media, which can be the storage media from which the data was initially retrieved, or other storage media. In some embodiments, the copying of retrieved data results in the data being shifted to another position on the storage media on which it was initially stored. Each media management component of the system involved in the deletion, such as a storage manager and a media management component updates its respective index to remove data relating to the selected data file that was deleted, and to add data relating to the data files copied to the storage media.

In another embodiment of the invention, a method is provided for selectively deleting data stored on storage media by identifying a storage media that contains more than one data file, including a data file that has been selected for deletion, for example, a data file selected manually by a user, or automatically in accordance with user preferences, storage policies or other storage logic. The storage media can be any media capable of storing data, such as a tape. In general, the storage media includes a data file in addition to the data file selected for deletion. The storage manager instructs a media management component to delete the selected data file. The deletion of the selected data file can be accomplished as described herein, such as by shifting the data file on a tape, writing zeros over the selected data file, removing pointers to the selected data file, or other deletion techniques.

The present invention further includes methods and systems operating in conjunction with a modular storage system to enable computers on a network to share storage devices on a physical and logical level. An exemplary modular storage system is the GALAXY™ storage management system and QiNetix™ available from CommVault Systems of New Jersey. The modular architecture underlying this system is described in the above referenced patent applications, each of which is incorporated herein.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
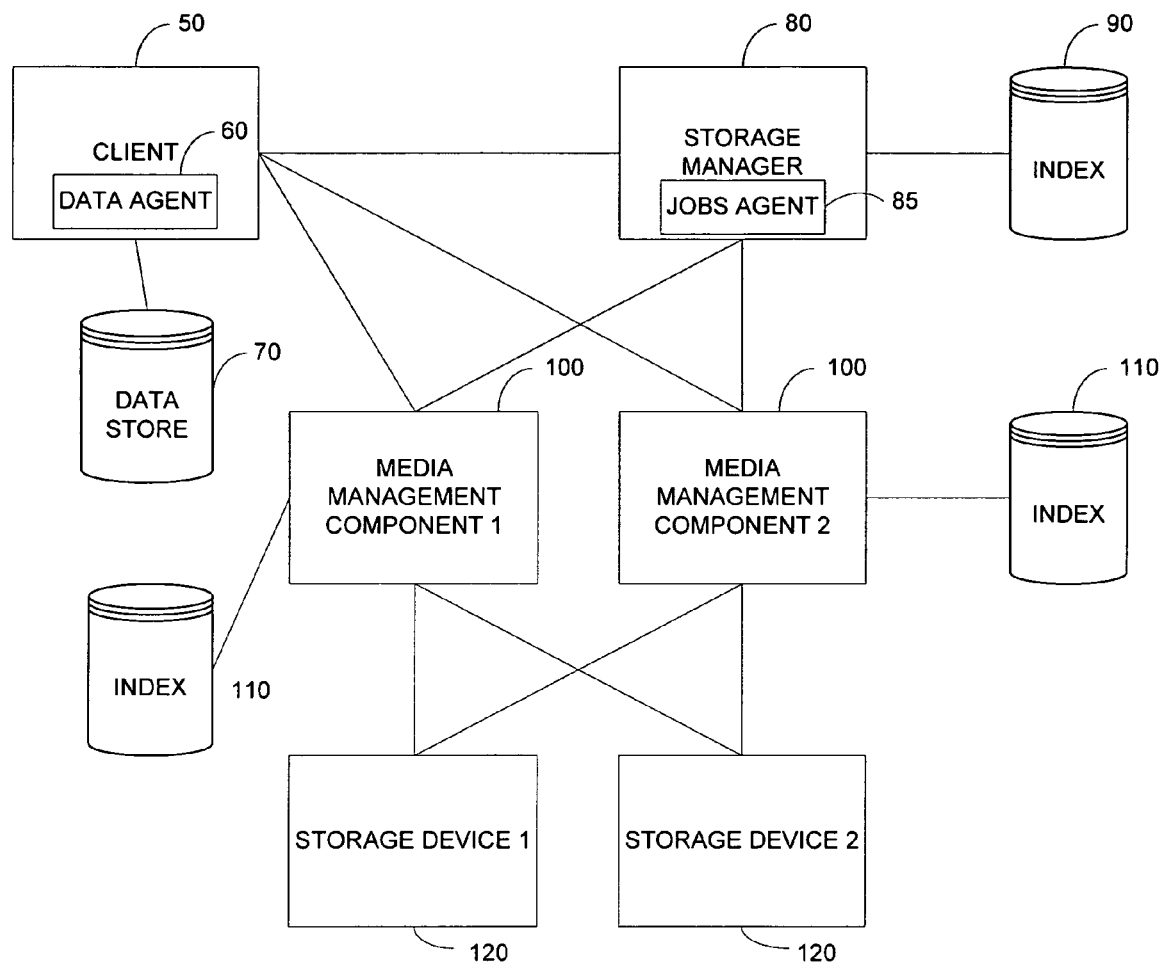
FIG. 1 is a block diagram showing a high-level view of the network architecture and components according to one embodiment of the invention.

FIG. 1 is a block diagram showing a high-level view of the network architecture and components according to one embodiment of the invention. As shown in FIG. 1, the system includes a client 50, a data agent 60, a data store 70, a storage manager (or storage management component) 80, a jobs agent 85, a storage manager index 90, one or more media management components (or media agent) 100, one or more media management component indexes 110, and one or more storage devices 120. Although FIG. 1 depicts a system having two media management components 100, there may be one media management component, or a plurality of media management components providing communication between client 50, storage manager 80 and storage devices 120. In addition, the system may include one or a plurality of storage devices 120.

A client 50 may be any networked client 50 and may include at least one attached data store 70. The data store 70 may be any memory device or local data storage device known in the art, such as a hard drive, CD-ROM drive, tape drive, RAM, or other types of magnetic, optical, digital and/or analog local storage. In some embodiments of the invention, client 50 includes at least one data agent 60, which is a software module that is generally responsible for performing storage operations for data of a client 50 stored in data store 70 or other memory location. Storage operations include, but are not limited to, creation, storage, retrieval, migration, deletion, and tracking of primary or production volume data, secondary volume data, primary copies, secondary copies, auxiliary copies, snapshot copies, backup copies, incremental copies, differential copies, synthetic copies, HSM copies, archive copies, Information Lifecycle Management ("ILM") copies, and other types of copies and versions of electronic data. In some embodiments of the invention, the system provides at least one, and typically a plurality of data agents 60 for each client, each data agent 60 is intended to backup, migrate, and recover data associated with a different application. For example, a client 50 may have different individual data agents 60 designed to handle Microsoft Exchange data, Lotus Notes data, Microsoft Windows file system data, Microsoft Active Directory Objects data, and other types of data known in the art.

The storage manager 80 is generally a software module or application that coordinates and controls the system, for example, storage manager 80 manages and controls storage operations performed by the system. The storage manager 80 communicates with all components of the system including client 50, data agent 60, media management components 100, and storage devices 120 to initiate and manage storage operations. The storage manager 80 typically has an index 90, further described herein, for storing data related to storage operations. In general, storage manager 80 communicates with storage devices 120 via a media management component 100. In another embodiment, not shown in FIG. 1, storage manager 80 communicates directly with storage devices 120.

The system includes one or more media management components 100. The media management component 100 is generally a software module that conducts data, as directed by the storage manager 80, between client 50 and one or more storage devices 120, for example, a tape library, a hard drive, a magnetic media storage device, an optical media storage device, or other storage device. The media management component 100 is communicatively coupled with and controls the storage device 120. For example, the media management component 100 might instruct a storage device 120 to archive, migrate, or restore application specific data. The media management component 100 generally communicates with the storage device 120 via a local bus such as a Small Computer System Interface (SCSI) adaptor.

Each media management component 100 maintains an index cache 110 which stores index data that the system generates during storage operations as further described herein. For example, storage operations for Microsoft Exchange data generate index data. Media management component index data includes, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data thus provides the system with an efficient mechanism for performing storage operations including locating user files for recovery operations and for managing and tracking stored data.

The system generally maintains two copies of the media management component index data regarding particular stored data. A first copy is generally stored with the data copied to a storage device 120. Thus, a tape may contain the stored data as well as index information related to the stored data. In the event of a system restore, the index data stored with the stored data may be used to rebuild a media management component index 110 or other index useful in performing storage operations. In addition, the media management component 100 that controls the storage operation also generally writes an additional copy of the index data to its index cache 110. The data in the media management component index cache 110 is generally stored on faster media, such as magnetic media, and is thus readily available to the system for use in storage operations and other activities without having to be first retrieved from the storage device 120.

The storage manager 80 also maintains an index cache 90. Storage manager index data is used to indicate, track, and associate logical relationships and associations between components of the system, user preferences, management tasks, and other useful data. For example, storage manager 80 might use its index cache 90 to track logical associations between media management components 100 and storage devices 120. The storage manager 80 may also use its index cache 90 to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

Index caches 90 and 110 typically reside on their corresponding storage component's hard disk or other fixed storage device. For example, jobs agent 85 of storage manager 80 may retrieve storage manager index 90 data regarding a storage policy and storage operation to be performed or scheduled for a particular client 50. The jobs agent 85, either directly or via another system module, communicates with data agent 60 for client 50 regarding the storage operation. In some embodiments, jobs agent 85 also retrieves from index cache 90 a storage policy associated with client 50 and uses information from the storage policy to communicate to data agent 60 one or more media management components 100 associated with performing storage operations for that particular client 50 as well as other information regarding the storage operation to be performed such as retention criteria, encryption criteria, streaming criteria, etc. The data agent 60 then packages or otherwise manipulates the client data stored in client data store 70 in accordance with the storage policy information and/or according to a user preference, and communicates this client data to the appropriate media management component(s) 100 for processing. The media management component(s) 100 store the data according to storage preferences associated with the storage policy including storing the generated index data with the stored data, as well as storing a copy of the generated index data in the media management component index cache 110.

In some embodiments, components of the system may reside and execute on the same computer. In some embodiments, a client component such as data agent 60, a media management component 100, or storage manager 80 coordinates and directs local archiving, migration, and retrieval application functions as further described in application Ser. No. 09/610,738. These client components may function independently or together with other similar client components.

The storage device 120 can be any storage device capable of storing data that is suitable for the purposes described herein. Some storage devices may have a robotic arm which is used to insert and remove storage media contained in the storage device or other technology to shuffle media in the storage device. The type of storage media used in the storage device may be, for example, magnetic tape, such as that depicted in FIG. 2, or other storage media.

Figure 2:
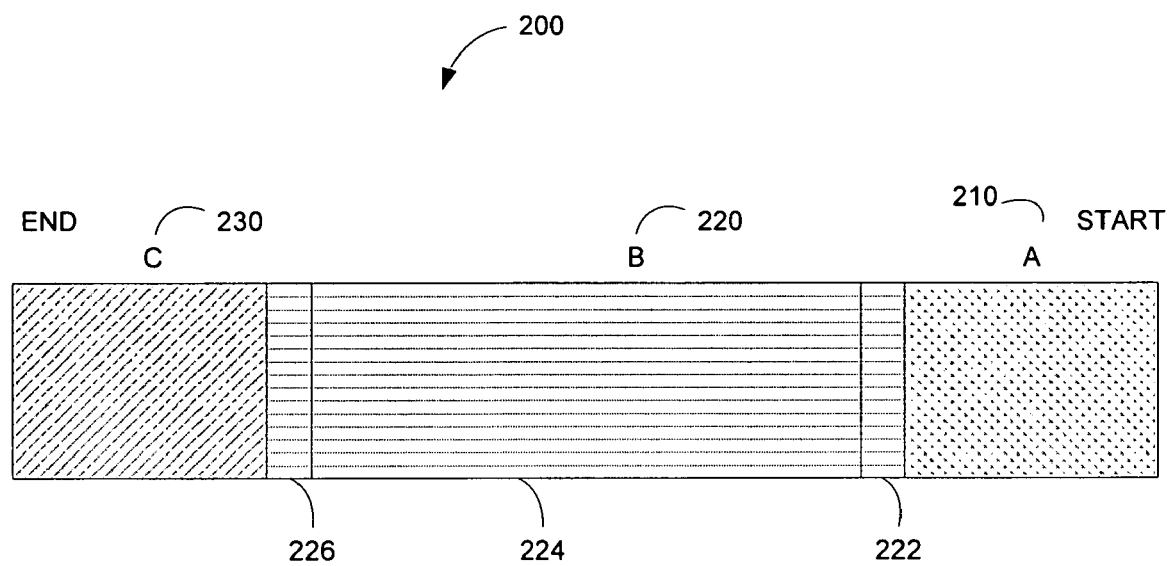
FIG. 2 is a diagram of an example of storage media utilized according to one embodiment of the invention.

As shown in FIG. 2, data is stored into storage media, such as magnetic tape 200. More than one data item, or file, is stored to tape, such as the three data files A, B and C, 210, 220 and 230, respectively on tape 200. Each of the three data files A, B and C, 210, 220, and 230 may represent different kinds of data, for example, File A 210 may be Oracle data, File B 220 may be Exchange Data, and File C 230 may be SQL data. In some embodiments, each data file may comprise one or more sections, such as sections 222, 224, and 226 of File B. Parts of file data in one or more embodiments, such as sections 222 and 226 are header and footer data, respectively. Header and footer sections 222 and 226 may include metadata associated with the data that is copied to the storage media, for example, section 224 of File B. Metadata is index data that is generally used to provide information about the data, such as data type, duration of storage, data associations with system components, and other data. Header and footer data is also used to indicate the beginning and end of a data file. In some embodiments when the tape is retrieved and read, the components use the header and footer data to determine the point on the tape at which each data file starts and finishes. In some embodiments, a copy of metadata is also stored to an index, such as media management component index 110 or storage manager index 90 and is used to locate files and to perform storage operations. In other embodiments, the sections 222, 224 and 226 of File B is a chunk of data for an archive file.

Figure 3:
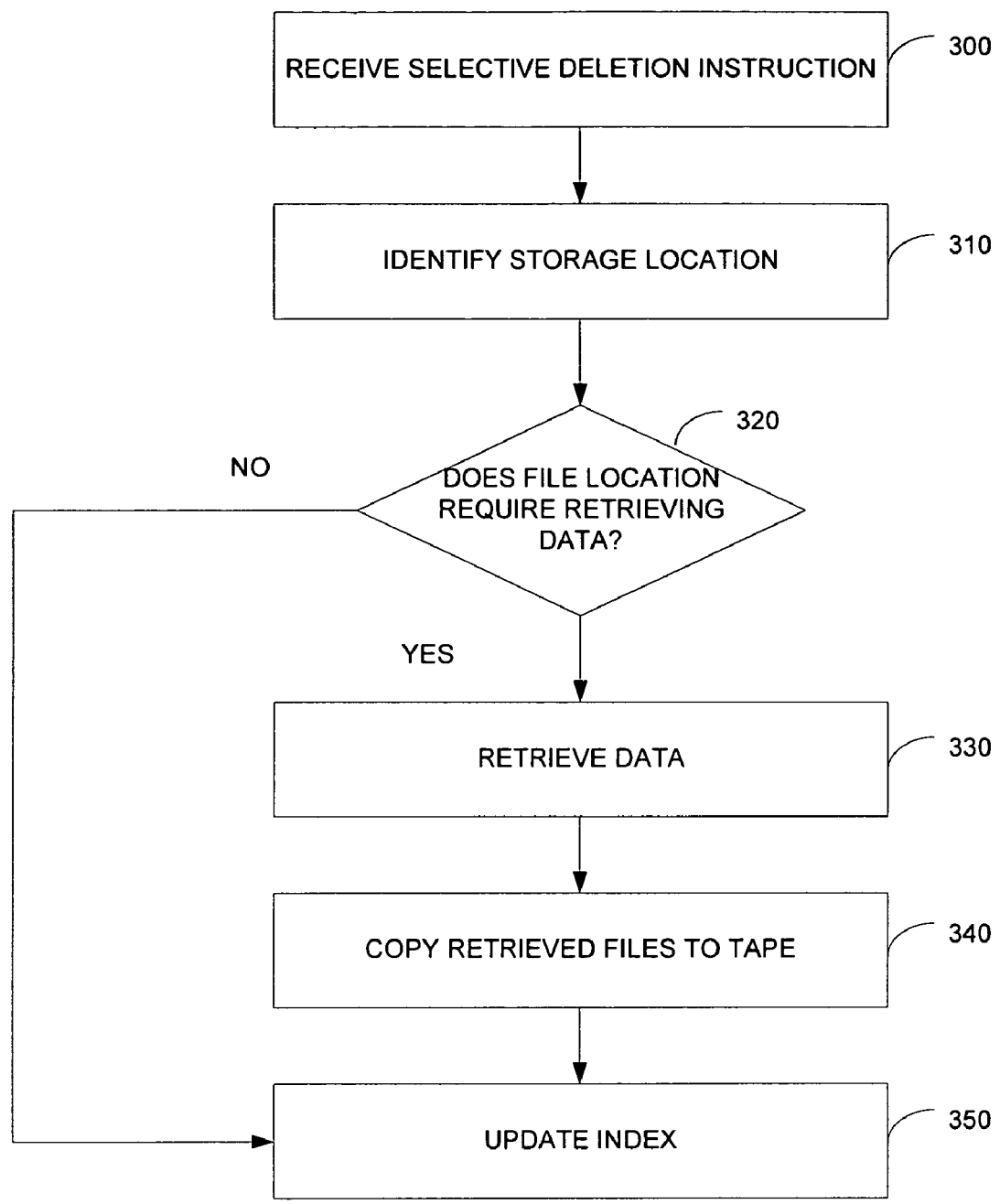
FIG. 3 is a flow diagram presenting a method for selectively deleting data stored on storage media according to one embodiment of the invention.

Referring to FIG. 3, a flowchart of a method according to the invention for selectively deleting data is shown. An instruction is received to selectively delete a data file, in step 300. In various embodiments, the instruction is manually input to the system by a user, automatically generated in accordance with, for example, storage policies, user preferences or other instruction logic, or at the command of the client. For example, the file selected to be deleted may be one single identified data file, or a plurality of data files, for example, all data files associated with a particular user, all data files of a certain type, e.g., all exchange data, all data files exceeding a set time duration, aging criteria, or other data identifier. The data files selected to be deleted are stored onto one or more tapes and are typically stored on the storage media interspersed with or otherwise storing one or more data files that are not selected to be deleted. For example, the one or more data files that are not selected for deletion satisfy an aging or migration criteria and do not need to be deleted.

The selective deletion instruction is processed by the storage manager, which identifies the storage location, step 310. In general, the storage location is determined by storage manager 80 communicating an instruction to a media management component 100, to identify the storage location of data file 210, 220 or 230, or more specifically, the storage device and tape on which the data is stored. In some embodiments, the storage manager 80 consults its index 90 to determine which media management component 100 is associated with or controls data file 210, 220 or 230 selected for deletion, and communicates with the appropriate media management component 100 to obtain information or data relating to the selected data file to perform a selective deletion operation. The media management component 100 then consults its index 110 to determine in which storage device and storage media data file 210, 220 or 230 is located. In addition, the media management component index 110 includes data indicating the location of the data file on the storage media, such as the offset and length of the data file 210, 220 or 230 on the storage media 200. For example, the index data may indicate that the selected file 220 to be deleted is located in the middle of magnetic tape 200 as shown in FIG. 2.

Referring back to FIG. 3, the media management component 100 communicates the storage location to storage manager 80 and storage manager 80 determines whether the data file location requires retrieving the data, in step 320. In general, retrieved data is copied to a media management component 100, other tape or other suitable medium for temporary storage. Data preceding selected data that is located at the middle or end of the tape are retrieved, in addition to the selected data, because the storage device, or other component, retrieves the data in the order that it is stored on the tape. Thus, if the selected data file is located at the middle or end, e.g., File B 220 or File C 230 of tape 200 of FIG. 2, all of the data preceding the selected data file, e.g., File A 210 must be retrieved in the order the data is read or in the sequence the data is stored on the tape. Conversely, if the selected data to be deleted is located at the start of the tape 200, e.g. File A 210, there is no data preceding the selected data that needs to be retrieved. In the case where the selected data is at the start of tape 200, that is File A 210, the media management component 100 will erase the data in the file by erasing the data. In general, erasing data comprises deleting pointers in media management component 100 or storage manager index 90 that reference the data file, thus indicating that the tape space is free, but other deletion techniques may also be used. Some storage devices 120 or other components may write data to storage media 200 after the last file entry on a tape. In these devices, data files may be shifted sequentially to the start of the tape to provide free space at the end of the tape.

Thus, if the selected file location is a point other than the starting point of the tape, the file location will require that all of the data files prior to and including the data file selected for deletion are retrieved, step 330, such as to the media management component, tape or other suitable media. In another embodiment, the retrieved data is copied to the media management component buffer, cache or other temporary storage 110. Each of the media management component 100, tape or other suitable media has the capacity to store data, for example, at least on a temporary basis. In some embodiments, a data pipe is used to retrieve the data. An example of a preferred data pipe for this storage operation is described in U.S. Pat. No. 6,418,478.

The retrieved data, except the data file selected for deletion, is copied back to tape 200 on which it was originally stored, or to another item of storage media 200, in step 340. Thus, the data copied to tape 200 omits the selected data file, which is pruned from the new version of the tape. The new version of the tape contains only files to be retained, thus, fewer data files are contained on the tape. In addition, the data is copied to the tape sequentially so that the new version of the tape contains a section of empty tape, preferably at one end of a length of tape, so that the tape may be used to store new or additional data. In some embodiments, copying data to tape 200 (in step 340) sequentially causes a shift in the location of the data. The shift reduces the likelihood of file fragments on storage media. That is, there are generally no empty sections of tape.

The media management component 100 communicates with storage manager 80 that the file deletion has occurred so that each of the media management component 100 and storage manager 80 may update its respective index 110 and 90 accordingly, step 350. The media management component and storage manager indexes 110 and 90 may be updated with the new data location or offset information for the remaining data files, and by deleting pointers to the deleted file and updating metadata and other storage data relating to the deleted data file.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein may be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method in a computing system for selectively deleting data stored on a storage medium, the method comprising:
   receiving an instruction to delete at least one selected data file contained on a first storage medium, wherein the first storage medium is a removable, magnetic tape;
   identifying in an index associated with the first storage medium a location of the at least one selected data file on the first storage medium, wherein the first storage medium contains at least one data file that precedes at least one selected data file;
   transferring from the first storage medium to a second storage medium at least one selected data file and at least one preceding data file; and
   transferring back from the second storage medium to the first storage medium the at least one preceding data file but not the at least one selected data file.

2. The method of claim 1, further comprising:
   automatically generating the received instruction from a storage policy.

3. The method of claim 1, further comprising:
   automatically generating the received instruction from user preferences.

4. The method of claim 1, wherein receiving the instruction includes receiving and processing the instruction via a storage manager.

5. The method of claim 1, wherein identifying in an index associated with the first storage medium a location of the at least one selected data file on the first storage medium includes reviewing the index via a storage manager.

6. The method of claim 1, wherein transferring from the first storage medium to the second storage medium the at least one selected data file and the at least one preceding data file includes transferring the data files in a sequence the data files are stored on the first storage medium.

7. The method of claim 1, wherein transferring from the first storage medium to the second storage medium the at least one selected data file and the at least one preceding data file includes transferring all data files that precede the at least one selected data file.

8. A method for selectively deleting data stored on a storage medium, the method comprising:
   receiving and processing an instruction to delete at least one selected data file from a first storage medium;
   identifying in an index associated with the data file, a location of the at least one selected data file on the first storage medium, wherein the first storage medium contains multiple data files, and wherein the first storage medium comprises magnetic tape storage;
   transferring from the first storage medium to a second storage medium at least one other data file preceding at least one selected data file; and
   deleting from the first storage medium the at least one selected data file without deleting the at least one other preceding data file, further comprising:
      using header and footer data associated with the at least one selected data file in order to determine a starting point or a finishing point on the magnetic tape storage at which the at least one selected data file starts or finishes, respectively;
      shifting the location of the at least one other preceding data file on the magnetic tape storage to either the starting point or the finishing point.

9. The method of claim 8, further comprising:
   automatically generating the received instruction from a storage policy.

10. The method of claim 8, wherein transferring from the first storage medium to the second storage medium the at least one other preceding data file includes transferring all data files that precede the at least one selected data file.

11. A computing system for selectively deleting data stored on a first storage medium comprising magnetic tape, the system comprising:
   means for receiving and processing an instruction to delete at least one selected data file stored on the first storage medium, wherein the first storage medium comprises magnetic tape;
   means for identifying a location of the at least one selected data file on the first storage medium, wherein the first storage medium contains multiple data files;
   means for transferring from the first storage medium to a second storage medium at least one data file preceding at least one selected data file;
   means for transferring back from the second storage medium to the first storage medium the transferred preceding data file of the multiple data files; and
   means for deleting from the first storage medium the at least one selected data file.

12. An apparatus for selectively deleting data stored on a storage device having a magnetic tape storage medium, the apparatus comprising:

- a storage device having a magnetic tape storage medium;
- a storage manager for receiving and processing an instruction to delete at least one selected data file from the magnetic tape storage medium, wherein the magnetic tape storage medium contains multiple data files, including at least one selected data file and at least one file that precedes the at least one selected data file;
- a media management component, coupled to the storage manager, for identifying a location of the at least one selected data file on the magnetic tape storage medium, wherein the media management component is also coupled to another storage device; and
- a jobs agent, in communication with the storage manager, for transferring from the magnetic tape storage medium to the other storage device the at least one data file that precedes the selected data file; wherein
- the storage device is coupled to the media management component for transferring back from the other storage device to the magnetic tape storage medium the at least one preceding data file.

13. The apparatus according to claim 12, wherein the instruction is automatically generated from a storage policy.

14. The apparatus according to claim 12, wherein the instruction is automatically generated from user preferences.

15. The apparatus according to claim 12, wherein the jobs agent consults a first index to determine which media management component controls the at least one selected data file.

16. The apparatus according to claim 12, wherein the storage manager communicates with the media management component to obtain data related to said at least one selected data file.

17. The apparatus according to claim 12, wherein the media management component consults a second index to identify a location of the at least one selected data file.

18. The apparatus according to claim 12, wherein the storage manager instructs the media management component to delete the at least one selected data file.

19. The apparatus according to claim 18, wherein the deleting comprises shifting the at least one preceding data file on the magnetic tape storage medium.

20. The apparatus according to claim 18, wherein the deleting comprises writing zeros over the at least one selected data file.

21. The apparatus according to claim 18, wherein the deleting comprises removing pointers in the second index that reference the at least one selected data file.

22. The apparatus according to claim 21, wherein the second index is updated with a new data location and offset information.

23. A computer readable storage medium storing program code which when executed on a computer, causes the computer to perform a method for selectively deleting data stored on a storage medium, the method comprising:

- receiving and processing an instruction to delete at least one selected data file from a first-storage medium comprising magnetic tape;
- identifying a location of the at least one selected data file on the first storage medium, wherein the first storage medium contains multiple data files, wherein identifying the location includes reviewing an index associated with the first data storage medium;
- transferring from the first storage medium to a second storage medium at least one other data file that precedes at least one selected data file; and
- transferring back from the second storage medium to the first storage medium the at least one other preceding data file.

24. The computer readable medium of claim 23, comprising automatically generating the instruction from a storage policy.

25. The computer readable medium of claim 23, wherein transferring from the first storage medium to a second storage medium comprises transferring data files using a first index associated with the first storage medium.

26. The computer readable medium of claim 23, wherein transferring from the first storage medium to the second storage medium at least one other data file comprises transferring all data files that precede the at least one selected data file in the sequence in which the data files are stored on the first storage medium.

27. The computer readable medium of claim 23, wherein deleting comprises removing pointers in a second index, the pointers referencing the at least one selected data file.

28. The computer readable medium of claim 27, wherein the second index is updated with new data location and offset information.

* * * * *

UNITED STATES PATENT AND TRADEMARK OFFICE
CERTIFICATE OF CORRECTION

PATENT NO. : 7,765,369 B1
APPLICATION NO. : 11/269521
DATED : July 27, 2010
INVENTOR(S) : Anand Prahlad et al.

It is certified that error appears in the above-identified patent and that said Letters Patent is hereby corrected as shown below:

In column 1, line 60, delete "2005;" and insert -- 2005. --, therefor.

In column 12, line 12, in claim 23, delete "first-storage" and insert -- first storage --, therefor.

Signed and Sealed this

Nineteenth Day of October, 2010

David J. Kappos
*Director of the United States Patent and Trademark Office*